United States Patent [19]

Kawada et al.

[11] Patent Number: 4,719,830
[45] Date of Patent: Jan. 19, 1988

[54] APPARATUS FOR CONTROLLING HEAT DEFORMATION OF A TURRET PUNCH

[75] Inventors: Kijyu Kawada, Atsugi; Nobuyuki Ikeda, Hatano, both of Japan

[73] Assignee: Amada Company, Limited, Japan

[21] Appl. No.: 933,324

[22] Filed: Nov. 20, 1986

Related U.S. Application Data

[63] Continuation of Ser. No. 754,146, Jul. 10, 1985, abandoned, which is a continuation of Ser. No. 565,139, Dec. 28, 1983, abandoned, which is a continuation of Ser. No. 264,851, May 18, 1981, abandoned.

[30] Foreign Application Priority Data

May 19, 1980 [JP] Japan .................... 55-065264

[51] Int. Cl.⁴ .................... B26D 7/10; B26D 5/08
[52] U.S. Cl. .................... 83/170; 83/552;
  83/859; 165/47; 165/32; 82/DIG. 1; 236/78 B;
  219/201; 62/DIG. 10
[58] Field of Search .................... 72/342, 455; 83/170,
  83/171, 911, 346, 552, 859; 82/DIG. 1;
  62/DIG. 10; 409/135, 136, 238, 239; 74/606 A;
  100/214; 165/32, 12, 27, 30, 47; 236/78 B;
  219/200, 201

[56] References Cited

U.S. PATENT DOCUMENTS

| 2,638,662 | 5/1953 | Rothwell . | |
| 3,066,578 | 12/1962 | Olton | 82/DIG. 1 |
| 3,186,275 | 6/1965 | Obenshain | 83/170 |
| 3,221,584 | 12/1965 | Novick | 219/469 |
| 3,236,124 | 2/1966 | Rhoades | 409/136 |
| 3,276,607 | 10/1966 | Thomas et al. . | |
| 3,554,064 | 1/1971 | Skiller | 83/170 |
| 3,692,418 | 9/1972 | Kopeler | 82/DIG. 1 |
| 4,250,785 | 2/1981 | Morishita et al. | 83/552 |

FOREIGN PATENT DOCUMENTS

| 2143143 | 1/1973 | Fed. Rep. of Germany | 83/170 |
| 2502972 | 9/1968 | Japan | 82/DIG. 1 |
| 437606 | 1/1975 | U.S.S.R. | 83/170 |

Primary Examiner—William R. Cline
Assistant Examiner—John K. Ford
Attorney, Agent, or Firm—Wigman & Cohen

[57] ABSTRACT

A method of and apparatus for controlling the heat deformation of machine tools having a plurality of frames is disclosed in which the temperatures at symmetrical or opposite portions of the frames are measured, analyzed and then utilized to maintain the temperatures of the frames at the same temperature, or to maintain a constant temperature difference between the frame portions. The frame portions may either be heated or cooled to obtain the desired temperature.

2 Claims, 3 Drawing Figures

APPARATUS FOR CONTROLLING HEAT DEFORMATION OF A TURRET PUNCH

This is a continuation of co-pending application Ser. No. 754,146, filed on July 10, 1985, now abandoned, which is a continuation of application Ser. No. 565,139, filed Dec. 28, 1983, which is a continuation of application Ser. No. 264,851, filed May 18, 1981, now abandoned.

BACKGROUND OF THE INVENTION

1. Field of the Invention

The present invention relates generally to machine tools such as turret punch presses and more particularly to a method and apparatus for controlling deformations of frames of machines to maintain a high degree of working accuracy thereof and longevity of the tools therefor.

2. Description of the Prior Art

Generally, in machine tools such as punching presses, heat will inevitably be produced because of friction and electrical resistance at various portions of the devices during operation such as bearings, clutch and brake parts and electric motors. Such heat will be produced not only over a wider temperature range and at different portions of the machine but also it will spread unevenly over the entire machine with the result that the frames of machine tools will be heated unevenly. Accordingly, some of the frames of the tools will be more deformed and some less by the heat produced during operation. This will result in the deflection of the frame out of desired conditions. Thus, in machine tools, the trouble has been that the working accuracy and the life of tools are decreased because of deformations of the frames caused by the heat produced during operation.

For instance, in a turret punch press having pairs of upper and lower punching tools, heat is liable to occur to deform the upper and lower frames in such a manner as to cause the upper and lower punching tools to deflect out of alignment with each other. Of course, when the upper and lower punching tools are not in accurate alignment with each other, the turret punch press will not be able to perform accurate punching operations and the upper and lower punching tools will also be broken or prematurely worn.

In order to overcome the above described disadvantages, some machine tools are finally assembled or completed by making adjustments after being initially warmed up by idling for hours. In this manner, however, the machine tools cannot be in the desired condition unless warmed up to the temperatures at which they were finally assembled or completed. In fact, the heat prevailing in machine tools always changes according to operation conditions. Therefore, much time is necessary, especially in winters until the machine tools are fully warmed up. Thus, it is impossible to keep the machine tools in the desired condition by finally assembling or completing the machine tools after initially warming up them. Thus, it is desirable to control the heat in the machine tools during operation.

SUMMARY AND OBJECTS OF THE INVENTION

It is a primary object of the present invention to provide a method and apparatus for controlling heat deformations of machine tools to keep the machine tools in the desired condition.

It is therefore another object of the present invention to provide a method and apparatus for controlling the heat or temperature produced at portions of machine tools during operation to control the heat deformation of frames in machine tools.

Accordingly, it is another object of the present invention to provide a method and apparatus for preventing the working accuracy and the life of tools from being decreased because of deformations of the frames of machine tools caused by the heat produced during operation.

According to the present invention, in order to accomplish these objects, degree of heat or temperature at opposite or symmetrical portions of a machine tool is kept equal to each other or a difference between the degrees of the heat or temperature is kept constant by detecting the heat or temperature at the opposite or symmetrical portions and then heating or cooling the portions according to the detected heat or temperature.

With these and other objects, advantages and features of the invention that may become hereinafter apparent, the nature of the invention may be more clearly understood by reference to the following detailed description of the invention, the appended claims and to the several drawings attached herein.

DESCRIPTION OF THE PREFERED EMBODIMENT

Figure 1:
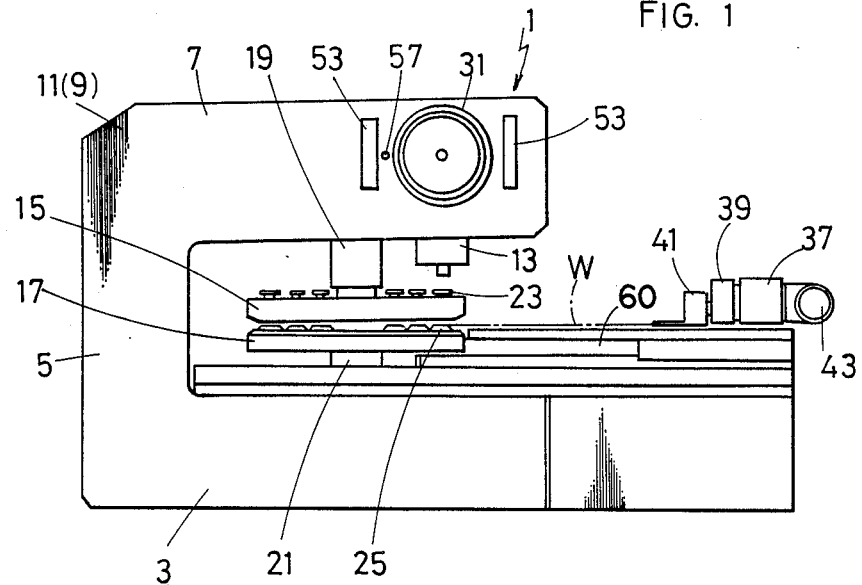
FIG. 1 is a side elevational view of a turret punch press embodying the principles of the present invention.
Figure 2:
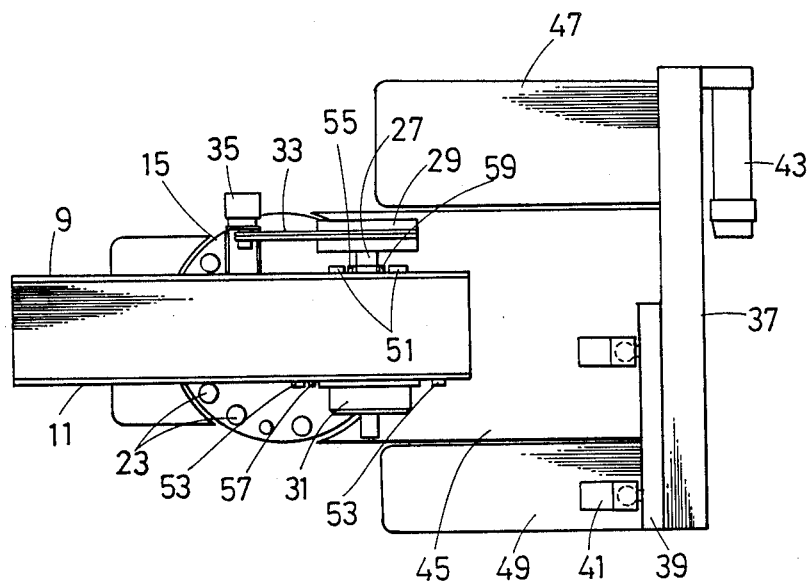
FIG. 2 is a plan view of the turret punch press shown in FIG. 2.

Referring now to FIGS. 1 and 2, the present invention will be described by way of example with regard to a turret punch press which is generally designated by the numeral 1.

The turret punch press 1 is constructed of a base 3, a column 5 vertically fixed to an end of the base 3 and an overhead beam 7 which is integrally connected to the top of the column 5 in a cantilever manner to extend in parallel with the base 3 and is constructed of right-hand and left-hand side frames 9 and 11. Also, the turret punch press 1 comprises a ram 13 and an upper turret 15 and a lower turret 17 having shafts 19 and 21, respectively, and holding a plurality of upper punching tools 23 and lower punching tools 25, respectively, which are varied in size and shape. The ram 13 is vertically movably mounted at the substantially midway portion of the overhead beam 7 to be vertically driven by means to be described hereinafter so as to act on the upper and lower punching tools 23 and 25 to punch the workpiece W which has been placed therebetween. The upper turret 15 is so mounted as to rotatably hand from the overhead beam 7 with its shaft 19 vertical to partially rotate beneath the ram 13, while the lower turret 17 is rotatably mounted on the base 3 just beneath the upper turret 15 in a coaxial relation therewith. Also, the upper and lower turrets 15 and 17 are so arranged that pairs of the upper and lower punching tools 23 and 25, common in size and shape, vertically align with each other. In this arrangement, they are simultaneously power driven to bring a desired pair of the upper and lower punching tools 23 and 25 into position beneath the ram 13. As seen from FIG. 2, the pairs of the upper and lower punching tools 23 and 25 are typically mounted on the upper and lower turrets 15 and 17 so as to stand in a circle along the peripheries thereof at an equal radial distance from the axes of the shafts 19 and 21 of the upper and lower turrets 13 and 15.

In order to vertically drive the ram 13, an eccentric shaft 27 is rotatably supported between the right-hand and left-hand frames 9 and 11 at the overhead beam 7 by means of suitable bearings. The eccentric shaft 27 is connected at its end projecting out of the right-hand frame 9 with a flywheel 29 which is provided at its inner portion with a clutch means, and is provided at its other end with a brake means 31. The flywheel 29 is provided at its inner portion with a clutch means (not shown) and is driven by means of a belt 33 by an electric motor 35 which is mounted on the overhead beam 7. Thus, the flywheel 29 is driven by the eccentric motor 35 through the belt 33. It will thus rotate the eccentric shaft 27 to vertically drive the ram 13 when the clutch means built in the flywheel 29 is actuated. Also, the eccentric shaft 27 will be stopped to stop driving the ram 13 when the clutch means is released to disconnect the eccentric shaft 27 from the flywheel 29 and the brake means 31 is simultaneously activated.

In order to feed and position the workpiece W to be punched, the turret punch press 1 is provided with a first carriage 37 which is movable toward and away from the upper and lower turrets 15 and 17 and a second carriage 39 which is slidably mounted on the first carriage 37 and holds a plurality of clamping means 41 for clamping the workpiece W. The first carriage 37 is slidably mounted on rails 60 which are fixed on the upper portion of the base 3 so that it may be horizontally moved toward and away from the upper and lower turrets 15 and 17 when driven by power. The second carriage 39, holding the clamping means 41, is mounted on the first carriage 37 so that it may be horizontally moved in directions at right angles with the rails 60 by an eccentric motor 43. Also, a fixed table 45 is provided on the base 3 so that the workpiece W can be slid thereon, and furthermore, a pair of movable tables 47 and 49 may be fixed to the first carriage 37 to hold the extending ends of the workpiece W.

In the above described arrangement, the workpiece W, which is gripped by the clamping apparatus 41, can be fed into position between the upper and lower turrets 15 and 17 just beneath the ram 13 by moving the first and second carriage 37 and 39. Before or as soon as the workpiece W is positioned between the upper and lower turrets 15 and 17 just beneath the ram 13, the pair of upper and lower punching tools 23 and 25 are placed just beneath the ram 13 by the upper and lower turrets 15 and 17. Thus, the workpiece W is punched by the upper and lower punching tools 23 and 25 when the ram 13 is lowered to press the upper punching tool 23. Also, a number of holes of varied size and shape, are automatically and continuously punched in the workpiece W by moving the upper and lower turrets 15 and 17 and the first and second carriages 37 and 39 under a preprogrammed numerical control.

In the turret punch press as heretofore described, heat will be produced during a punching operation mainly because of the friction experienced by the flywheel 29, the clutch parts, the eccentric shaft 27, the brake means 31 and the electrical resistance of the electric motor 35. Since the flywheel 29 is always kept rotated by the electric motor 35 at the right-hand frame 9, the heat will be higher at the right-hand frame 9 than at the left-hand frame 11, although it will spread over both of the frames 9 and 11. Accordingly, the right-hand frame 9 will be deformed by the heat much more than the left-hand frame 11 in such a manner as to cause the shaft 19 of the upper turret 15 to deflect out of alignment with the shaft 21 of the lower turret 17. As a matter of course, if the upper and lower turrets 15 and 17 are deflected out of alignment with each other, the upper and lower punching tools 23 and 25 will be also deflected out of alignment with each other with the result that the punching accuracy is decreased and the upper lower punching tools 23 and 25 are broken or prematurely worn. Although the turret punch press 1 can be assembled or completed taking the heat deformations of the frames 9 and 11, into account the difficulty is that the heat produced during punching operations will always change according to punching conditions and therefore the degree of the heat deformations cannot be accurately predetermined.

According to the present invention, in order to overcome the above disadvantages, the degree of heat at the right-hand and left-hand frames 9 and 11 is kept equal to each other or the difference between the degrees of the heat thereat is kept constant to make the right-hand and left-hand frames 9 and 11 equally deformed during punching operations of the turret punch press 1. Also, in order to keep the degrees of the heat at the right-hand and left-hand frame equal to each other to keep the difference therebetween constant either or both of the right-hand and left-hand frames 9 and 11 is or are heated or cooled. Otherwise, the right-hand frame 9 is cooled and the left-hand frame 11 is simultaneously heated.

Referring again to the drawings, an embodiment in which both of the right-hand frames 9 and 11 of the turret punch press 1 are heated to keep the degrees of the heat thereat equal to each other or to keep the difference therebetween constant will be described. As shown in FIGS. 1 and 2, a plurality of heating means 51 are mounted in the proximity of the right-hand end of the eccentric shaft 27 at the right-hand frame 9, and a plurality of heating means 53 is provided likewise in the proximity of the brake means 31 at the left-hand frame 11. Also, heat detecting means 55 and 57, such as thermistors, are mounted in the proximity of the right-hand end of the eccentric shaft 27 and the brake means 31, respectively, at the right-hand and left-hand frames 9 and 11, respectively, to detect the heat or temperature thereat. Furthermore, a heat detecting switch means 59, such as a thermostat, is mounted in the proximity of the right-hand end of the eccentric shaft 27 at the right-hand frame 9 in the preferred embodiment to detect the heat or temperature at the right-hand frame 9 for the purpose to be seen further described hereinafter.

Figure 3:
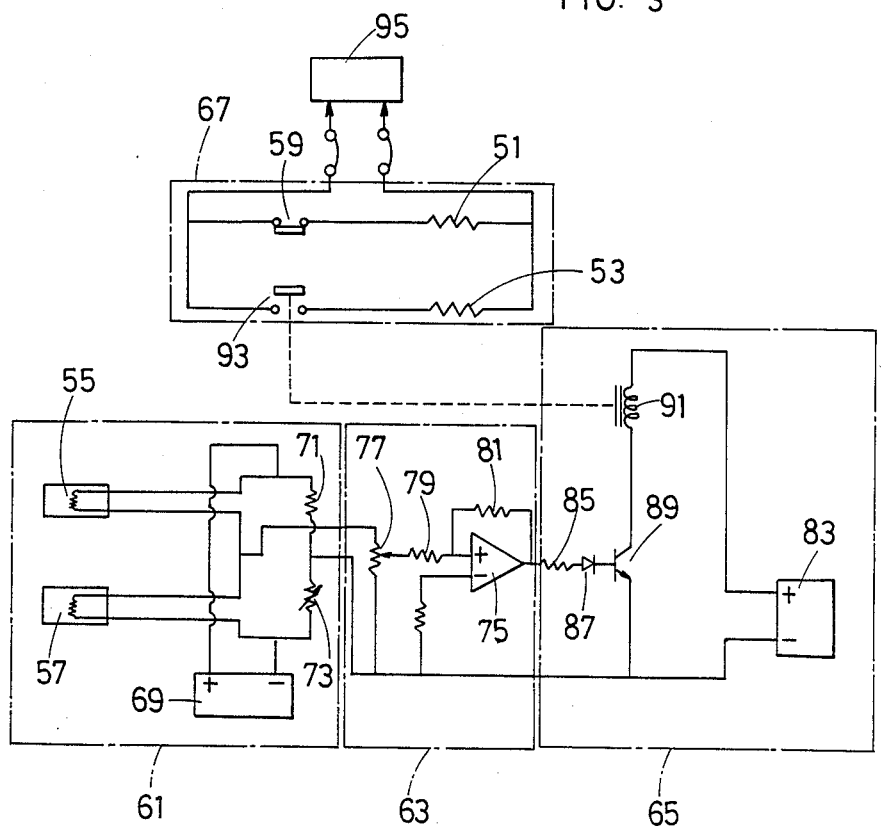
FIG. 3 shows a control circuit which embodies the principles of the present invention and can be employed for the turret punch press shown in FIGS. 1 and 2.

Referring now specifically to FIG. 3, the heating means 51 and 53, the heat detecting means 55 and 57 and the heat detecting switch means 59 are incorporated into an electric control circuit to keep the degree of the heat at the right-hand and left-hand frames 9 and 11 equal to each other or to keep the difference therebetween constant. More particularly, the electric control circuit of FIG. 3 is so arranged as to control the heating means 51 and 53 according to the amount of heat which is detected by the heat detecting means 55 and 57 and also the heat detecting switch means 59. The electric control circuit comprises a bridge circuit 61 in which the heat detecting means 55 and 57 are provided, an amplifying circuit 63, a solenoid energizing circuit 65 and a heating circuit 67 where the heating means 51 and 53 and also the heat detecting switch means 59 are incorporated. The bridge circuit 61 is connected to a direct current source 69 and comprises a fixed resistor 71 and a variable resistor 73 in addition to the heat detecting means 55 and 57 so as to control the output voltage according to the difference between the amount of the heat at the right-hand and left-hand frames 9 and 11 detected by the heat detecting means 55 and 57. The amplifying circuit 63 is connected to the bridge circuit 61 and comprises an operational amplifier 75, a variable resistor 77 and resistors 79 and 81 to amplify the output voltage transmitted from the bridge circuit 61. The solenoid energizing circuit 65 is connected to the amplifying circuit 63 and a direct current source 83 and comprises a resistor 85, a diode 87, a transistor 89 and a relay solenoid 91 having a normally open contact 93. This contact is provided in the heating circuit 67 for purposes to be described hereinafter. The heating circuit 67 is connected to an electric source 95 and generally it is so constituted that the heating means 51 is connected with the heat detecting switch means 59 which is normally closed and the heating means 53 is connected with the normally open contact 93. In the heating circuit 67, the normally closed heat detecting switch means 59 is so arranged as to become open by itself to turn off the heating means 51 when the heat at the right-hand frame 9 has reached a preset level. Also, the normally open contact 93 is so arranged as to be closed by the solenoid 91 of the solenoid energizing circuit 65 to enable the heating means 53 to heat the left-hand frame 11 when the solenoid 91 is energized in a manner to be described hereinafter.

In the above described electric control circuit, the levels of heat at the right-hand and left-hand frames 9 and 11 are detected by the heat detecting means 55 and 57, respectively, which are mounted at the right-hand and left-hand frames 9 and 11, respectively, as has been described. When the levels of heat detected at the right-hand and left-hand frames 9 and 11 are not equal to each other or the difference between the detected degrees of the heat is changed from a predetermined value, an output voltage is transmitted to the solenoid energizing circuit 65 after amplification by the amplifying circuit 65, to energize the solenoid 91. As has been described, the normally open contact 93 of the heating circuit 67 will be closed to enable the heating means 53 to heat the left-hand frame 11 as soon as the solenoid 91 is energized.

In the embodiment of the above-described arrangement, the heating means 51 is provided to heat the right-hand frame 9 for the purpose of warming up that frame to place the turret punch press 1 in a desired condition in case the turret punch press 1 was finally assembled or completed after being initially warmed up. However, it will be understood that the heating means 51 is not necessary if the turret punch press 1 is finally assembled or completed without being initially heated, since the left-hand frame 11 can be heated by the heating means 53 as the heat at the right-hand frame 9 increases, according to the present invention. As has earlier been described hereinbefore, the right-hand and left-hand frames 9 and 11 can be cooled to control the heat defomations according to the present invention, although they are heated in the preferred embodiment as described above. For example, suitable means for absorbing heat, by utilizing, for instance, Peltier effect devices can be used in place of the heating means 51 and 53 so as to positively cool the right-hand and left-hand frames 9 and 11. Also, in order to keep the level of the heat at the right-hand and left-hand frames 9 and 11 equal to each other or keep the difference between the degrees of the heat constant or a predetermined value, both of the right-hand and left-hand frames 9 and 11 can be cooled by a fan or fans or otherwise the right-hand frame 9 can be cooled by a fan while the left-hand frame 11 can be warmed by using the heated air prevailing around the right-hand frame 9.

Although a preferred form of the present invention has been illustrated and described, it should be understood that the device is capable of modification by one skilled in the art without departing from the principles of the invention. Accordingly, the scope of the invention is to be limited only by the claims appended hereto.

What is claimed:

1. Apparatus for controlling heat deformation of a turret punch comprising:
   a C-shaped frame having a base and a beam cantilevered on said base and positioned above said base to define a throat section between said beam and said base, and having a rotational axis;
   an upper shaft mounted on said beam and having a rotational axis;
   a lower shaft mounted on said base and having a rotational axis coaxial with the rotational axis of the upper shaft;
   a pair of opposed upper and lower turrets rotatably mounted on said upper shaft and lower shaft, respectively, said turrets having mounted thereon coacting tools adapted to be rotated into alignment;
   a ram mounted on said beam for vertical movement along an axis which is parallel with and spaced a predetermined distance from the rotational axes of the upper and lower shafts;
   ram drive means mounted on said beam for vertically moving said ram into contact with said coacting tools for punching operation;
   means for rotating said upper and lower shafts to rotate said upper and lower turrets so as to align said coacting tools with said ram for punching operation;
   said ram drive means constituting a heat source disposed asymmetrically on said beam which causes thermal deformation of said beam and misalignment of said upper and lower shafts at right angles to the rotational axes of the upper and lower shafts, whereby said tools on the upper and lower turrets become misaligned from said ram;
   temperature detection means provided at symmetrical portions on said beam is proximity to said ram drive means for detecting the temperature of said beam at said symmetrical portions thereof;
   circuit controlling means connected to said temperature detection means for determining the temperature of each of said symmetrical portions of the beam and for comparing the determined temperatures to one another to further determine which of the temperatures is the greater; and
   temperature controlling means provided at the symmetrical portions of the beam for changing the temperature of one of the symmetrical portions of the beam to bring said portions to substantially the same temperature whereby the heat deformation of said turret punch frame is controlled.

2. The apparatus of claim 1 wherein said ram drive means includes a drive motor mounted on said beam, an eccentric shaft mounted on said beam, a flywheel mounted on said eccentric connected to said drive motor, a clutch means and a brake means connected to said flywheel for selectively stopping the operation of said ram, wherein said temperature detection means and temperature controlling means are provided on said beam in close proximity to said eccentric shaft and said brake means.

* * * * *